(12) United States Patent
Moon et al.

(10) Patent No.: US 11,900,570 B2
(45) Date of Patent: Feb. 13, 2024

(54) IMAGE PROCESSING SYSTEM FOR PERFORMING IMAGE QUALITY TUNING AND METHOD OF PERFORMING IMAGE QUALITY TUNING

(71) Applicant: Samsung Electronics Co., Ltd., Suwon-si (KR)

(72) Inventors: Kyounghwan Moon, Suwon-si (KR); Jungyeob Chae, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 219 days.

(21) Appl. No.: 17/179,789

(22) Filed: Feb. 19, 2021

(65) Prior Publication Data

US 2021/0390670 A1 Dec. 16, 2021

(30) Foreign Application Priority Data

Jun. 16, 2020 (KR) ........................ 10-2020-0073247

(51) Int. Cl.
*G06T 5/00* (2006.01)
*G06T 5/50* (2006.01)
(Continued)

(52) U.S. Cl.
CPC .............. *G06T 5/006* (2013.01); *G06T 5/009* (2013.01); *G06T 5/50* (2013.01); *H04N 25/61* (2023.01); *H04N 25/683* (2023.01)

(58) Field of Classification Search
CPC .......... G06T 5/006; G06T 5/009; G06T 5/50; G06T 1/20; G06T 5/001; H04N 25/61;
(Continued)

(56) References Cited

U.S. PATENT DOCUMENTS 7,633,555 B2 12/2009 Yang et al.
8,059,956 B2 11/2011 Kim et al.
(Continued)

FOREIGN PATENT DOCUMENTS

CN 110519498 A 11/2019
CN 113436081 A 9/2021
(Continued)

OTHER PUBLICATIONS

Office action dated Mar. 1, 2023, issued in corresponding U.S. Appl. No. 17/217,282.
(Continued)

*Primary Examiner* — Matthew C Bella
*Assistant Examiner* — Pardis Sohraby
(74) *Attorney, Agent, or Firm* — Harness, Dickey & Pierce, P.L.C.

(57) ABSTRACT

An image processing system includes a memory configured to store a plurality of reference images used for image quality tuning, an image signal processor configured to receive a plurality of captured images corresponding to the plurality of reference images and configured to generate a plurality of corrected images by being configured to perform a corresponding image processing operation among a plurality of image processing operations, and a tuning module configured to set parameters of the plurality of image processing operations based on the plurality of corrected images and the plurality of reference images.

19 Claims, 14 Drawing Sheets

(51) Int. Cl.
*H04N 25/61* (2023.01)
*H04N 25/683* (2023.01)

(58) Field of Classification Search
CPC ... H04N 25/683; H04N 25/611; H04N 25/674
USPC ....................................................... 382/275
See application file for complete search history.

(56) References Cited

U.S. PATENT DOCUMENTS

| | | | |
|---|---|---|---|
| 8,223,230 | B2 | 7/2012 | Chan et al. |
| 8,325,248 | B2* | 12/2012 | Yanowitz ............... G06T 5/00 348/222.1 |
| 8,411,153 | B2 | 4/2013 | Cho |
| 8,634,673 | B1* | 1/2014 | McDougal ............. G06T 5/00 382/274 |
| 9,219,847 | B2* | 12/2015 | Finnila ................. H04N 23/617 |
| 9,275,445 | B2 | 3/2016 | Granados et al. |
| 9,462,945 | B1* | 10/2016 | Barriga ................. A61B 3/152 |
| 9,734,567 | B2 | 8/2017 | Zhang et al. |
| 10,373,336 | B1 | 8/2019 | Islam et al. |
| 10,388,035 | B2 | 8/2019 | Takahashi |
| 10,922,798 | B2 | 2/2021 | Ahn et al. |
| 11,297,245 | B2* | 4/2022 | Wang ..................... H04N 5/33 |
| 2004/0247175 | A1 | 12/2004 | Takano et al. |
| 2006/0007321 | A1 | 1/2006 | Huai |
| 2012/0188399 | A1 | 7/2012 | Zhang |
| 2013/0084022 | A1 | 4/2013 | Chan et al. |
| 2013/0258044 | A1* | 10/2013 | Betts-Lacroix ........ H04N 23/45 348/E5.09 |
| 2013/0342711 | A1 | 12/2013 | Gyotoku |
| 2017/0070671 | A1 | 3/2017 | Cho |
| 2017/0208255 | A1 | 7/2017 | Christen et al. |
| 2017/0310901 | A1* | 10/2017 | Sheikh .................. H04N 23/68 |
| 2017/0330337 | A1* | 11/2017 | Mizutani .............. G06T 3/4038 |
| 2019/0020871 | A1 | 1/2019 | Xu et al. |
| 2019/0043209 | A1* | 2/2019 | Nishimura ............ H04N 5/213 |
| 2019/0379816 | A1 | 12/2019 | Shaick |
| 2020/0389588 | A1* | 12/2020 | Sharma ................. H04N 23/80 |
| 2021/0090220 | A1* | 3/2021 | Manchi ............... G06T 3/0093 |
| 2021/0120175 | A1* | 4/2021 | Park ..................... H04N 23/80 |
| 2021/0133943 | A1 | 5/2021 | Lee et al. |

FOREIGN PATENT DOCUMENTS

| | | | | |
|---|---|---|---|---|
| EP | 0 680 014 | A2 | 11/1995 | |
| EP | 0680014 | B1 * | 7/2001 | ............ G06T 15/10 |
| WO | WO-2019152481 | A1 * | 8/2019 | ............ G06T 5/00 |

OTHER PUBLICATIONS

U.S. Office Action dated Jul. 5, 2023 issued in co-pending U.S. Appl. No. 17/217,282.

U.S. Office Action dated Nov. 17, 2023 issued in co-pending U.S. Appl. No. 17/217,282.

* cited by examiner

FIG. 11

| REF_IMG1 | WHITE IMAGE | DEFECT PIXEL CORRECTION |
|---|---|---|
| REF_IMG2 | BLACK IMAGE | DEFECT PIXEL CORRECTION, OFFSET CORRECTION |
| REF_IMG3 | GREY IMAGE | GAMMA |
| REF_IMG4 | RECTANGULAR IMAGE | LENS DISTORTION CORRECTION |
| REF_IMG5 | COLOR IMAGE | DEMOSAIC, COLOR GAIN CORRECTION, COLOR CORRECTION MATRIX |
| REF_IMG6 | RESOLUTION IMAGE | DENOISE |
| REF_IMG7 | COMPLEX IMAGE | ALL |

IMAGE PROCESSING SYSTEM FOR PERFORMING IMAGE QUALITY TUNING AND METHOD OF PERFORMING IMAGE QUALITY TUNING

CROSS-REFERENCE TO RELATED APPLICATION

This application is based on and claims priority under 35 U. S. C. § 119 to Korean Patent Application No. 10-2020-0073247, filed on Jun. 16, 2020, in the Korean Intellectual Property Office, the disclosure of which is incorporated by reference herein in its entirety.

BACKGROUND

The inventive concepts relate to an image processing system configured to perform image quality tuning and a method of performing image quality tuning, and more particularly, to an image processing system configured to automatically set parameters of image processing operations based on reference images used for image quality tuning and an image obtained by capturing the reference images and a method of performing image quality tuning.

Recently, demands on camera modules including image sensors are continuously increasing. For example, utilization of cameras is increasing such that two or more camera modules are mounted in a smart phone and cameras are mounted in and outside a vehicle.

In accordance with such demands, a higher performance application processor including an image signal processor (ISP) for processing a bayer image of an image sensor is being developed. However, because image quality tuning of the ISP is performed through passive measures, too much manpower is required and it takes longer to perform image quality tuning.

SUMMARY

The inventive concepts relate to an image processing system configured to perform image quality tuning for automatically setting parameters of image processing operations based on reference images used for image quality tuning and an image obtained by capturing the reference images and a method of performing image quality tuning.

According to an aspect of the inventive concepts, there is provided an image processing system including a memory configured to store a plurality of reference images used for image quality tuning and processing circuitry configured to receive a plurality of captured images corresponding to the plurality of reference images, configured to generate a plurality of corrected images by being configured to perform a corresponding image processing operation among a plurality of image processing operations, and configured to set parameters of the plurality of image processing operations based on the plurality of corrected images and the plurality of reference images.

According to an aspect of the inventive concepts, there is provided an image processing system including a memory configured to store a plurality of reference images used for image quality tuning and processing circuitry configured to perform a plurality of image processing operations and configured to perform a tuning operation of setting a parameter of a target image processing operation among the plurality of image processing operations. The tuning operation includes obtaining an image by capturing a reference image corresponding to the target image processing operation, controlling the image signal processor to generate a corrected image by performing the target image processing operation on the captured image based on a parameter of the target image processing operation, and updating the parameter of the target image processing operation based on the corrected image and the reference image. The processing circuitry is configured to perform the tuning operation on each of the plurality of image processing operations.

According to an aspect of the inventive concepts, there is provided an image quality tuning method including obtaining a plurality of captured images by capturing a plurality of reference images, generating a plurality of corrected images by performing at least one corresponding image processing operation among a plurality of image processing operations on the plurality of captured images, and setting parameters of the plurality of image processing operations based on the plurality of corrected images and the plurality of reference images.

BRIEF DESCRIPTION OF THE DRAWINGS

Example embodiments of the inventive concepts will be more clearly understood from the following detailed description taken in conjunction with the accompanying drawings in which:

FIG. 11 is a view illustrating mapping information between a reference image and an image processing operation according to example embodiments of the inventive concepts;

DETAILED DESCRIPTION OF EXAMPLE EMBODIMENTS

Figure 1:
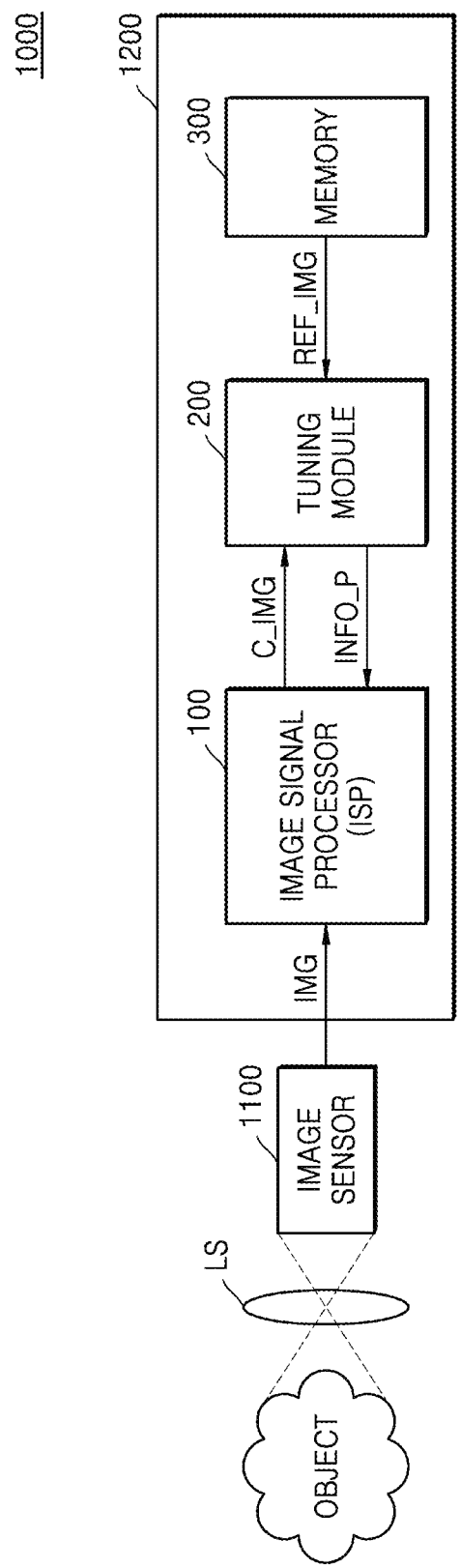
FIG. 1 is a block diagram illustrating an image processing device according to example embodiments of the inventive concepts.

FIG. 1 is a block diagram illustrating an image processing device 1000 according to example embodiments of the inventive concepts.

Referring to FIG. 1, the image processing device 1000 may include an image sensor 1100 and/or an image processing system 1200. The image processing device 1000 may perform an image processing operation on an image. The image processing device 1000 may be implemented by a personal computer (PC), an Internet of Things (IoT) device, or a portable electronic device. The portable electronic device may include a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device. In addition, the image processing device 1000 may be mounted in an electronic device such as a drone or an advanced driver assistance system (ADAS) or an electronic device provided in a vehicle, furniture, a manufacturing device, a door, or various measuring devices.

The image sensor 1100 may convert an optical signal of an object OBJECT, which is incident through an optical lens LS, into an electrical signal, may generate an image IMG based on electrical signals, and may output the generated image IMG. The image sensor 1100 may include, for example, a pixel array including a plurality of two-dimensionally arranged pixels and a readout circuit and the pixel array may convert received optical signals into electrical signals. The pixel array may be implemented by a photoelectric conversion device such as a charge coupled device (CCD) or a complementary metal oxide semiconductor (CMOS) or each of various kinds of photoelectric conversion devices. The readout circuit may generate raw data based on the electrical signal provided by the pixel array and may output the raw data, on which preprocessing such as removing of the raw data Raw data or a bad pixel is performed, as the image IMG. The image sensor 1100 may be implemented by a semiconductor chip or package including the pixel array and the readout circuit.

In FIG. 1, it is illustrated that the image sensor 1100 and the image processing system 1200 are separate from each other. However, the inventive concepts are not limited thereto. According to example embodiments, the image processing system 1200 may be implemented to include the image sensor 1100.

The image processing system 1200 may include an image signal processor 100, a tuning module 200, and/or a memory 300. The image processing system 1200 may perform an image processing operation on the received image IMG. For example, the image processing system 1200 may perform an image processing operation of correcting the image IMG such as a sensor correction operation, a lens distortion correction operation, a color correction operation, or an image quality improvement operation by using the image signal processor 100.

The image processing system 1200 according to example embodiments of the inventive concepts may previously perform image quality tuning for setting a parameter of an image processing operation before performing the image processing operation. Hereinafter, an image quality tuning operation of the image processing system 1200 will be described in detail.

The image signal processor 100 may receive the image IMG from the image sensor 1100. The inventive concepts are not limited thereto and the image signal processor 100 may receive the image IMG from the memory 300 or through a communication with an external device (not shown).

According to example embodiments of the inventive concepts, the image IMG received by the image signal processor 100 may be obtained by capturing a reference image REF_IMG used for image quality tuning. In some example embodiments, the reference image REF_IMG may include various images used for an image quality tuning operation of setting parameters of image processing operations such as the sensor correction operation, the lens distortion correction operation, the color correction operation, and the image quality improvement operation. The reference image REF_IMG may include a white image, a black image, a grey image, a rectangular image, a resolution image, and a color image. In addition, the reference image REF_IMG may include a mixed image including a combination of the above-described images.

The image signal processor 100 may generate a corrected image C_IMG by performing the image processing operation on the received image IMG. For example, the image signal processor 100 may generate the corrected image C_IMG by performing the image processing operation on the image IMG based on a default parameter. In some example embodiments, the default parameter may mean a parameter of the image processing operation set while manufacturing the image processing system 1200 and may be changed by a manufacturer or a user. The image signal processor 100 may transmit the corrected image C_IMG to the tuning module 200.

The image processing operation performed by the image signal processor 100 in the above description may vary in accordance with the reference image REF_IMG corresponding to the received image IMG. In an example, the image signal processor 100 may determine which reference image REF_IMG is captured to obtain the received image IMG and may perform the image processing operation corresponding to the reference image REF_IMG based on mapping information on a corresponding image processing operation by reference image REF_IMG.

For example, the image signal processor 100 may receive the image IMG obtained by capturing the rectangular image that is the reference image REF_IMG and may determine that the image processing operation corresponding to the rectangular image is the lens distortion correction operation by using the mapping information. In some example embodiments, the image signal processor 100 may generate the corrected image C_IMG by performing the lens distortion correction operation on the received image IMG based on the default parameter of the lens distortion correction operation.

The tuning module 200 may receive the corrected image C_IMG from the image signal processor 100. The tuning module 200 may receive the reference image REF_IMG corresponding to the corrected image C_IMG received from the memory 300. For example, when the tuning module 200 receives the corrected image C_IMG obtained by capturing the color image, the reference image REF_IMG corresponding to the color image may be received from the memory 300. The memory 300 may be volatile memory such as dynamic random access memory (DRAM) or static RAM (SRAM) or non-volatile memory such as phase change RAM (PRAM), resistive RAM (ReRAM), or flash memory. The memory 300 may store the reference image REF_IMG or the mapping information or the corrected image C_IMG corrected by the image signal processor 100.

The tuning module 200 may determine a final parameter of the image processing operation based on the corrected image C_IMG and the reference image REF_IMG. For example, the tuning module 200 may calculate correlation by comparing the corrected image C_IMG with the reference image REF_IMG and may determine the final parameter based on the calculated correlation. The tuning module 200 may transmit parameter information INFO_P including the determined parameter to the image signal processor 100.

For example, the image signal processor 100 may transmit the corrected image C_IMG to the tuning module 200 by performing the lens distortion correction operation on the image IMG obtained by capturing the rectangular image. The tuning module 200 may calculate the correlation by comparing the corrected image C_IMG with the rectangular image that is the reference image REF_IMG and may determine the parameter of the lens distortion correction operation based on the calculated correlation. The tuning module 200 may transmit the parameter information INFO_P including the parameter of the determined lens distortion correction operation to the image signal processor 100. The image signal processor 100 may perform the lens distortion correction operation on the image IMG input later based on the parameter included in the received parameter information INFO_P.

The tuning module 200 may be implemented by firmware, software, or hardware. The tuning module 200 may be implemented in the form of a combination of software and hardware.

Further, any of the elements disclosed herein may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The image processing system 1200 according to example embodiments of the inventive concepts may perform the image processing operation a plurality of times based on not the default parameter but a plurality of parameters having different values and may set the parameter of the image processing operation based on a plurality of corrected images and a reference image in performing the image quality tuning operation. Hereinafter, an image quality tuning method, in which the image processing system 1200 sets the parameter of the image processing operation by performing the image processing operations based on the plurality of parameters having the different values, will be descried in detail with reference to FIG. 2.

Figure 2:
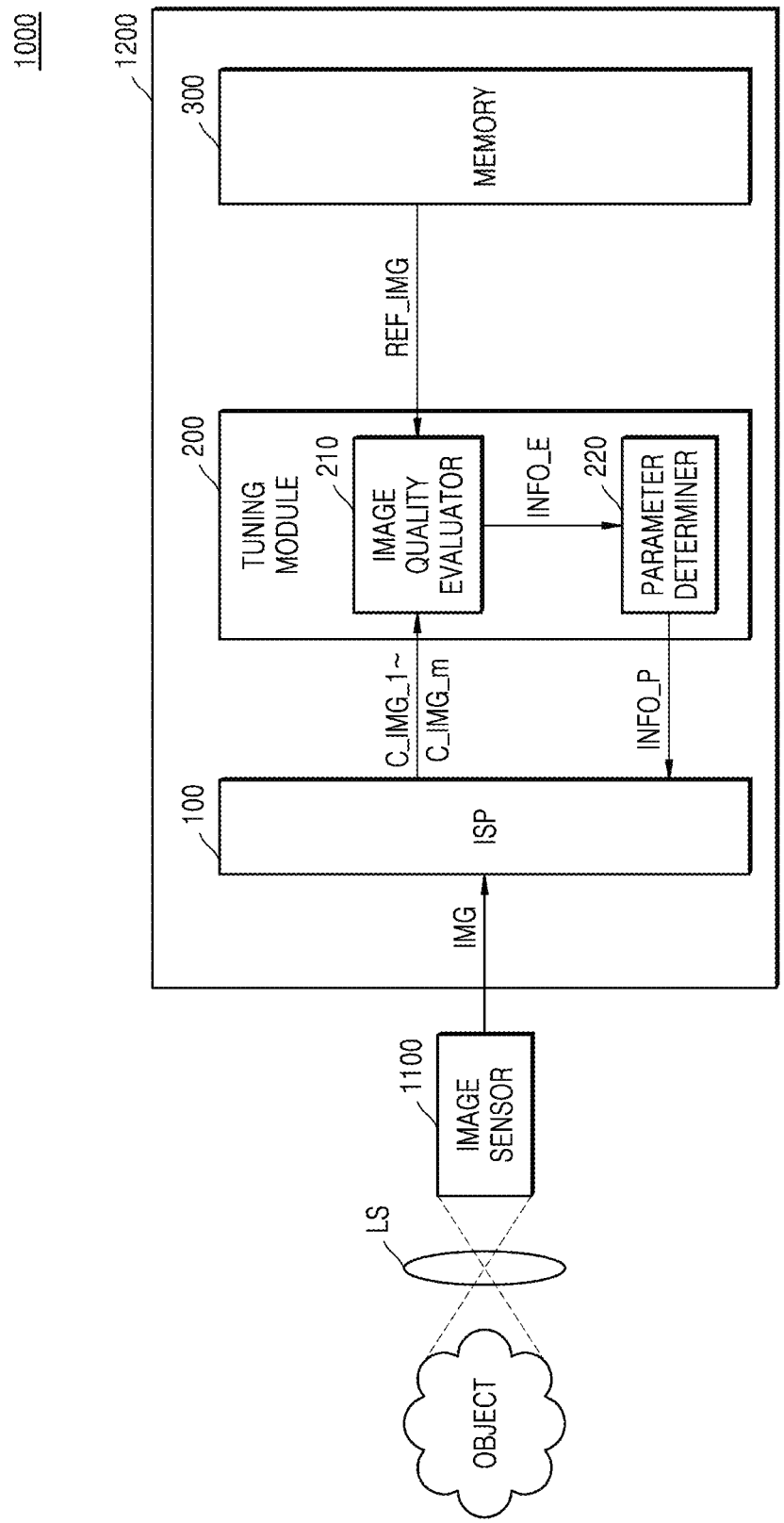
FIG. 2 is a block diagram specifically illustrating an image processing device according to example embodiments of the inventive concepts.

FIG. 2 is a block diagram specifically illustrating the image processing device 1000 according to example embodiments of the inventive concepts. For example, FIG. 2 is a block diagram illustrating the image processing device 1000 in detail. In FIG. 2, description previously given with reference to FIG. 1 will be omitted.

Referring to FIGS. 1 and 2, the image processing device 1000 may receive the image IMG obtained by capturing the reference image REF_IMG. The image signal processor 100 may perform the image processing operation corresponding to the received image IMG.

For example, the image signal processor 100 may determine the image processing operation corresponding to the image IMG (that is, the image processing operation corresponding to the captured reference image REF_IMG) based on the mapping information on the corresponding image processing operation by reference image REF_IMG. The image signal processor 100 may perform the determined image processing operation on the image IMG.

The image signal processor 100 may perform the determined image processing operation based on not only one default parameter of the determined image processing operation but the plurality of default parameters having the different values. The image signal processor 100 may determine a parameter range set for the image processing operation, may select the plurality of default parameters having the different values, which are included in the parameter range, and may perform the image processing operation based on the selected plurality of default parameters. The image signal processor 100 may generate first to mth corrected images C_IMG_1 to C_IMG_m by performing the image processing operations on the image IMG a plurality of times. The image signal processor 100 may transmit the first to mth corrected images C_IMG_1 to C_IMG_m to the tuning module 200.

The tuning module 200 may include an image quality evaluator 210 and/or a parameter determiner 220. The image quality evaluator 210 may receive the first to mth corrected images C_IMG_1 to C_IMG_m from the image signal processor 100. The image quality evaluator 210 may receive the reference image REF_IMG from the memory 300.

The image quality evaluator 210 may generate evaluation information INFO_E by comparing the first to mth corrected images C_IMG_1 to C_IMG_m with the reference image REF_IMG. For example, the image quality evaluator 210 may calculate correlations between the first to mth corrected images C_IMG_1 to C_IMG_m and the reference image REF_IMG and may generate the evaluation information INFO_E based on the calculated correlations.

The correlations may be calculated based on sum of absolute difference (SAD) and mean absolute difference (MAD). The inventive concepts are not limited thereto and various correlation calculating methods may be applied. The evaluation information INFO_E may be implemented to include scores corresponding to the correlations between each of the first to mth corrected images C_IMG_1 to C_IMG_m and the reference image REF_IMG or priorities corresponding to the correlations.

According to example embodiments, the image quality evaluator 210 may perform preprocessing such as scale up/down or warping so that the first to mth corrected images C_IMG_1 to C_IMG_m may be matched to the reference image REF_IMG. The image quality evaluator 210 may provide the evaluation information INFO_E to the parameter determiner 220.

The parameter determiner 220 may determine the final parameter of the image processing operation based on the received evaluation information INFO_E. For example, the parameter determiner 220 may determine the corrected image closest to the reference image REF_IMG among the first to mth corrected images C_IMG_1 to C_IMG_m based on the evaluation information INFO_E and may determine a parameter used for generating the determined corrected image as the final parameter of the image processing operation.

A method of the parameter determiner 220 determining the final parameter based on the evaluation information INFO_E is not limited to the above-described example and the final parameter may be determined by various methods. For example, the parameter determiner 220 may determine the final parameter by performing an additional operation on the parameter used for generating the determined corrected image.

The parameter determiner 220 may transmit the received parameter information INFO_P including the final parameter to the image signal processor 100. The image signal processor 100 may determine the final parameter based on the received parameter information INFO_P and may perform the image processing operation on the image IMG input later based on the final parameter.

As described above, the image processing system 1200 according to the inventive concepts may perform the image quality tuning by setting the parameter of the image processing operation based on the reference image REF_IMG used for the image quality tuning and the image IMG obtained by capturing the reference image REF_IMG. In particular, the image processing system 1200 according to example embodiments of FIG. 2 may set an optimal parameter by performing the image processing operation a plurality of times based on the parameters having the different values for the image IMG and comparing the first to mth corrected images C_IMG_1 to C_IMG_m with the reference image REF_IMG.

The image processing system 1200 according to the inventive concepts may repeatedly perform the above-described image quality tuning operation for remaining image processing operations. For example, when an image quality tuning operation for a first image processing operation is completed, an image quality tuning operation for a second image processing operation may be performed. As described above, the image processing system 1200 may sequentially and repeatedly perform the image quality tuning operation on the plurality of image processing operations. Example embodiments in which the image quality tuning operation is repeatedly performed on the plurality of image processing operations will be described in detail with reference to FIGS. 3 and 4.

Figure 3:
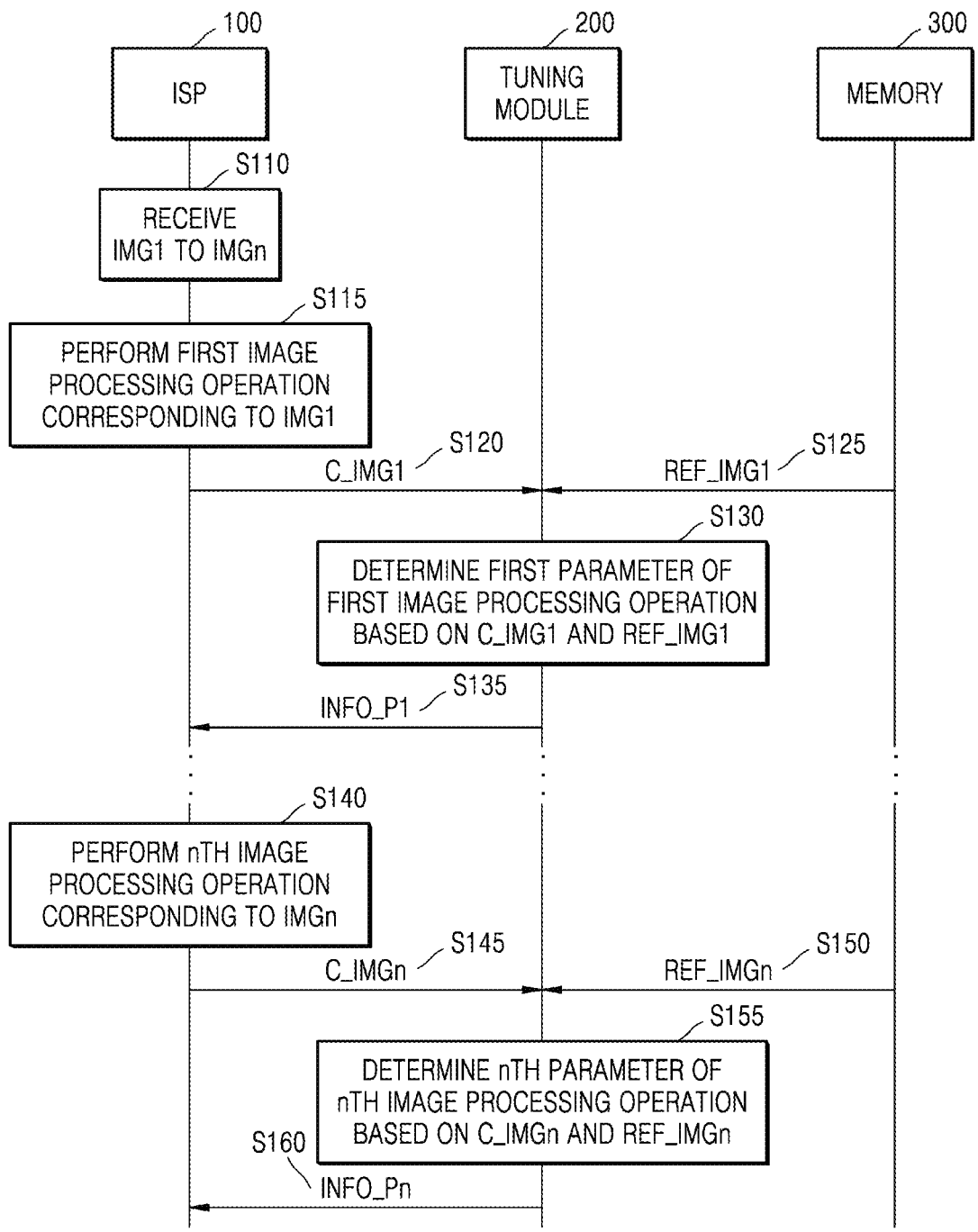
FIG. 3 is a flowchart illustrating an image quality tuning operation among an image signal processor, a tuning module, and memory according to example embodiments of the inventive concepts.

FIG. 3 is a flowchart illustrating an image quality tuning operation among the image signal processor 100, the tuning module 200, and the memory 300 according to example embodiments of the inventive concepts. In detail, FIG. 3 is a view illustrating example embodiments in which image quality tuning operations are sequentially performed on the plurality of image processing operations.

Referring to FIG. 3, the image signal processor 100 may receive first to nth images IMG1 to IMGn in operation S110. In some example embodiments, the first to nth images IMG1 to IMGn may be obtained by capturing first to nth reference images REF_IMG1 to REF_IMGn.

The image signal processor 100 may perform the first image processing operation corresponding to the first image IMG1 among the first to nth reference images REF_IMG1 to REF_IMGn in operation S115. When the first image processing operation is completed, the image signal processor 100 may transmit the first corrected image C_IMG1 generated by the first image processing operation to the tuning module 200 in operation S120.

The tuning module 200 may receive the first reference image REF_IMG1 corresponding to the first image IMG1 from the memory 300 in operation S125. The tuning module 200 may determine a first parameter P1 of the first image processing operation based on the first corrected image C_IMG1 and the first reference image REF_IMG1 in operation S130. The tuning module 200 may transmit first parameter information INFO_P1 including the first parameter P1 to the image signal processor 100 in operation S135.

The image signal processor 100 and the tuning module 200 may repeatedly perform the series of operations of operations S115 to S130 to an image of the next order among the first to nth images IMG1 to IMGn. The image signal processor 100 and the tuning module 200 may complete the image quality tuning operation when the series of operations are completed on the nth image IMGn in the final order.

That is, the image signal processor 100 may perform an nth image processing operation corresponding to the nth image IMGn in the final order in operation S140 and the image signal processor 100 may transmit the nth corrected image C_IMGn generated by the nth image processing operation to the tuning module 200 in operation S145. The tuning module 200 may receive the nth reference image REF_IMGn corresponding to the nth image IMGn from the memory 300 in operation S150 and may determine an nth parameter Pn of the nth image processing operation based on the nth corrected image C_IMGn and the nth reference image REF_IMGn in operation S155. The tuning module 200 may transmit the nth parameter information INFO_Pn including the nth parameter Pn to the image signal processor 100 in operation S160. The image quality tuning operation of the image processing system 1200 may be completed.

In repeatedly performing the series of operations S115 to S130 on the plurality of image processing operations, the image signal processor 100 and the tuning module 200 may performed the series of operations in the predetermined or alternatively, desired order. In some example embodiments, the predetermined or alternatively, desired order may mean the order set so that the image quality tuning operation may be efficiently performed based on characteristics of the image processing operations. A detailed operation of repeatedly performing the series of operations in the predetermined or alternatively, desired order will be described later with reference to FIGS. 7 and 8.

In FIG. 3, it is illustrated that the number (that is, n) of images IMG1 to IMGn received by the image signal processor 100 is equal to the number (that is, n) of performed image processing operations. However, the inventive concepts are not limited thereto. For example, two or more image processing operations may correspond to each of the images IMG1 to IMGn. Therefore, the number of performed image processing operations may be greater than the number of images IMG1 to IMGn.

In addition, in FIG. 3, it is illustrated that the number (that is, n) of image processing operations is equal to the number (that is, n) of parameters P1 to Pn. However, the inventive concepts are not limited thereto. For example, two or more parameters may correspond to each of the image processing operations. For example, each of the image processing operations may be based on two or more parameters. Therefore, the number of parameters may be greater than the number of image processing operations.

As described above, the image processing system 1200 according to the inventive concepts may complete image quality tuning in a shorter period than conventional manually performed image quality tuning and may reduce manpower required for image quality tuning by automatically setting parameters of all image processing operations.

Figure 4:
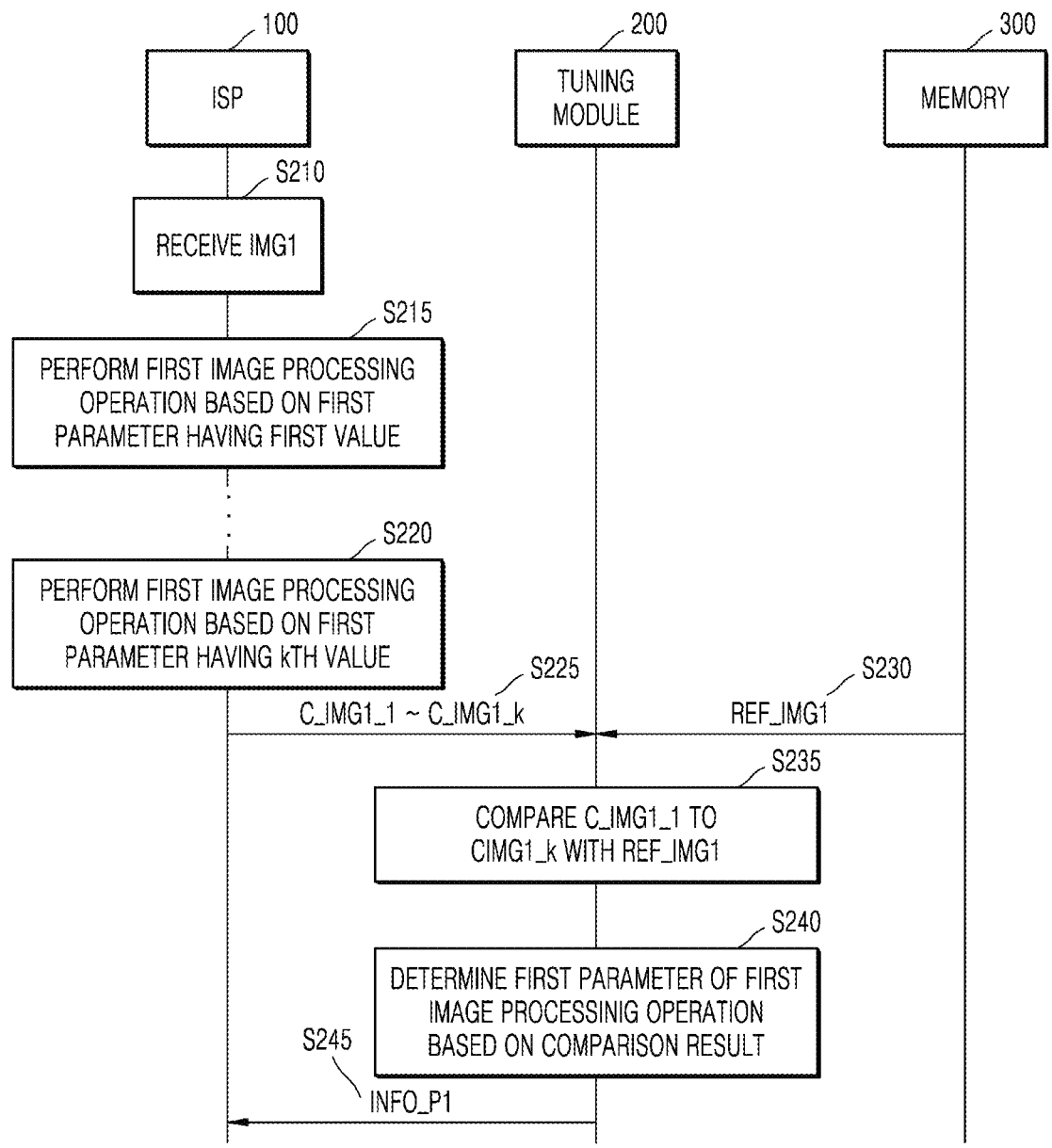
FIG. 4 is a flowchart illustrating a first parameter setting operation among an image signal processor, a tuning module, and memory according to example embodiments of the inventive concepts.

FIG. 4 is a flowchart illustrating a first parameter setting operation among the image signal processor 100, the tuning module 200, and/or the memory 300 according to example embodiments of the inventive concepts. In detail, FIG. 4 is a view illustrating example embodiments of a detailed operation of setting the first parameter P1 of the first image processing operation corresponding to the first image IMG1 of FIG. 3.

Referring to FIG. 4, the image signal processor 100 may receive the first image IMG1 in operation S210. The image signal processor 100 may perform the first image processing operation corresponding to the first image IMG1 based on the first parameter P1 having a first value in operation S215. When the first image processing operation is completed, the image signal processor 100 may repeat the above operation S215 based on the first parameter P1 having a next value. When the image signal processor 100 performs the first image processing operation based on the first parameter P1 having a kth value in the final order in operation S220, first to kth first corrected images C_IMG1_1 to C_IMG1_k generated by first image processing operations performed k times may be transmitted to the tuning module 200 in operation S225.

The first to kth values may be included in a parameter range set for the first image processing operation. In an example, the image signal processor 100 may select the fixed first to kth values from the parameter range set for the first image processing operation, may arbitrarily select the first to kth values, or may select the first to kth values distributed at equal intervals.

The tuning module 200 may receive the first reference image REF_IMG1 from the memory 300. The tuning module 200 may compare the first to kth first corrected images C_IMG1_1 to C_IMG1_k with the first reference image REF_IMG1 in operation S235. For example, the tuning module 200 may calculate correlations between the first to kth first corrected images C_IMG1_1 to C_IMG1_k and the first reference image REF_IMG1.

The tuning module 200 may determine the first parameter P1 of the first image processing operation based on the comparison result in operation S240. For example, the tuning module 200 may determine the image closest to the first reference image REF_IMG1 among the first to kth first corrected images C_IMG1_1 to C_IMG1_k based on the calculated correlations. The tuning module 200 may finally determine a parameter corresponding to the determined image as the first parameter P1 of the first image processing operation. For example, when the kth corrected image C_IMG1_k is determined to be closest to the first reference image REF_IMG1 among the first to kth first corrected images C_IMG1_1 to C_IMG1_k, the tuning module 200 may determine the first parameter P1 having the kth value as the final parameter of the first image processing operation. The tuning module 200 may transmit the first parameter information INFO_P1 including the final parameter to the image signal processor 100 in operation S245.

In such a method, the image signal processor 100 may set the first parameter P1 of the first image processing operation corresponding to the first image IMG1. The image signal processor 100 may set parameters of corresponding image processing operations for remaining images (for example, the second to nth images IMG2 to IMGn of FIG. 3) by the same method.

In FIGS. 3 and 4, it is illustrated that, when an image quality tuning operation is completed on one image processing operation, the image signal processor 100 and the tuning module 200 perform an image quality tuning operation on a next image processing operation. However, the inventive concepts are not limited thereto. For example, the image signal processor 100 and the tuning module 200 may perform a plurality of image quality tuning operations on a plurality of image processing operations in parallel. Example embodiments in which the plurality of image quality tuning operations are performed on the plurality of image processing operations in parallel will be described in detail with reference to FIGS. 5 and 6.

Figure 5:
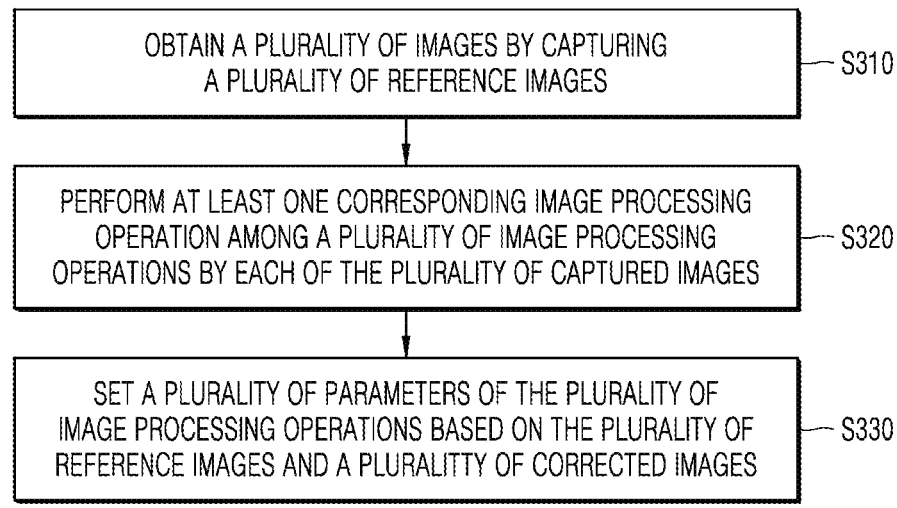
FIG. 5 is a flowchart illustrating a method of operating an image processing system according to example embodiments of the inventive concepts.

FIG. 5 is a flowchart illustrating a method of operating the image processing system 1200 according to example embodiments of the inventive concepts. In detail, FIG. 5 is a flowchart illustrating a method of operating the image processing system 1200 of FIG. 1 or 2. Hereinafter, example embodiments in which the image processing system 1200 performs the plurality of image quality tuning operations on the plurality of image processing operations in parallel will be described.

Referring to FIG. 5, the image processing system 1200 may obtain a plurality of images obtained by capturing a plurality of reference images in operation S310. For example, the image signal processor 100 of the image processing system 1200 may receive a plurality of captured images from an image sensor 1100 positioned in or outside the image processing system 1200 or through communications with an external device.

The image processing system 1200 may perform at least one corresponding image processing operation among the plurality of image processing operations by each of the plurality of captured images in operation S320. For example, the image signal processor 100 may determine the image processing operations corresponding to the plurality of captured images (that is, the image processing operations corresponding to the captured reference images) based on the mapping information on the corresponding image processing operation by reference image. The image signal processor 100 may generate the plurality of corrected images by performing the determined image processing operations on the plurality of captured images.

For example, the image signal processor 100 may receive a first image and a second image. When the first image is obtained by capturing the first reference image, the image signal processor 100 may determine the first image processing operation corresponding to the first reference image based on the mapping information. The image signal processor 100 may generate the first corrected image by performing the determined first image processing operation on the first image. When the second image is obtained by capturing a second reference image, the image signal processor 100 may determine the second image processing operation corresponding to the second reference image based on the mapping information. The image signal processor 100 may generate the second corrected image by performing the second image processing operation on the second image.

The image processing system 1200 may set the final parameters of the plurality of image processing operations based on the plurality of reference images and the plurality of corrected images in operation S330. For example, the tuning module 200 of the image processing system 1200 may receive the plurality of corrected images from the image signal processor 100. The tuning module 200 may receive the plurality of reference images from the memory 300. The tuning module 200 may compare each of the plurality of corrected images with a corresponding reference image among the plurality of reference images and may set the final parameters of the plurality of image processing operations based on the comparison result. Because a method of setting the final parameters of the plurality of image processing operations based on the comparison result may be the same as the method described above with reference to FIG. 1 or 2, previously given description is omitted.

For example, the tuning module 200 may receive the first corrected image and the second corrected image from the image signal processor 100 and may receive the first reference image and the second reference image from the memory 300. The tuning module 200 may compare the first corrected image with the first reference image and may compare the second corrected image with the second reference image. The tuning module 200 may set the final parameter of the first image processing operation and the final parameter of the second image processing operation based on the comparison result.

The image processing system 1200 may perform the plurality of image processing operations on an image input later based on the set final parameters. For example, the tuning module 200 may transmit the parameter information including the final parameters of the plurality of image processing operations to the image signal processor 100. The image signal processor 100 may determine the final parameters based on the received parameter information and may perform the plurality of image processing operations on an image input later based on the final parameters.

Figure 6:
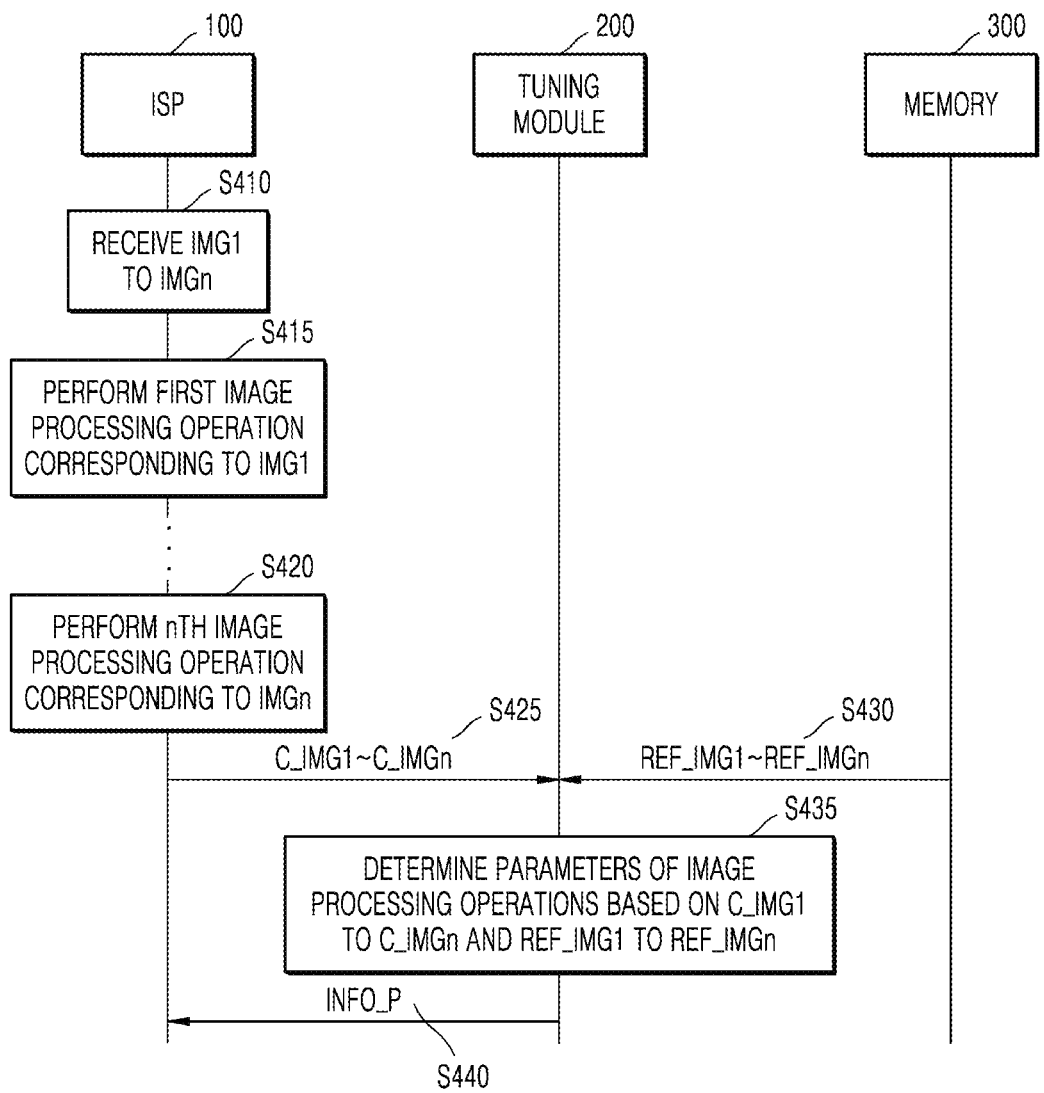
FIG. 6 is a flowchart illustrating an image quality tuning operation among an image signal processor, a tuning module, and memory according to example embodiments of the inventive concepts.

FIG. 6 is a flowchart illustrating an image quality tuning operation among the image signal processor 100, the tuning module 200, and/or the memory 300 according to example embodiments of the inventive concepts. In detail, FIG. 6 is a view illustrating example embodiments in which the plurality of image quality tuning operations are performed in parallel on the plurality of image processing operations.

Referring to FIG. 6, the image signal processor 100 may receive the first to nth images IMG1 to IMGn in operation S410. In some example embodiments, the first to nth images IMG1 to IMGn may be obtained by capturing the first to nth reference images REF_IMG1 to REF_IMGn.

The image signal processor 100 may perform the first image processing operation corresponding to the first image IMG1 among the first to nth images IMG1 to IMGn in operation S415. When the first image processing operation is completed, the image signal processor 100 may perform the image processing operation corresponding to the next image (for example, the second image IMG2) among the first to nth images IMG1 to IMGn. The image signal processor 100 may repeat the above-described operation until the nth image processing operation corresponding to the nth image IMGn is performed in operation S420.

The image signal processor 100 may transmit the first to nth corrected images C_IMG1 to C_IMGn generated by the first to nth image processing operations to the tuning module 200 in operation S425. The tuning module 200 may receive the first to nth reference images REF_IMG1 to REF_IMGn from the memory 300 in operation S430.

The tuning module 200 may determine the parameters of the image processing operations based on the first to nth corrected images C_IMG1 to C_IMGn and the first to nth reference images REF_IMG1 to REF_IMGn in operation S435. For example, the tuning module 200 may determine a corresponding reference image among the first to nth reference images REF_IMG1 to REF_IMGn for each of the first to nth corrected images C_IMG1 to C_IMGn, may calculate a degree of similarity to the determined reference image, and may determine the final parameter of the corresponding image processing operation based on the calculation result. The tuning module 200 may transmit the parameter information INFO_P including the final parameters of the image processing operations to the image signal processor 100 in operation S440.

Figure 7:
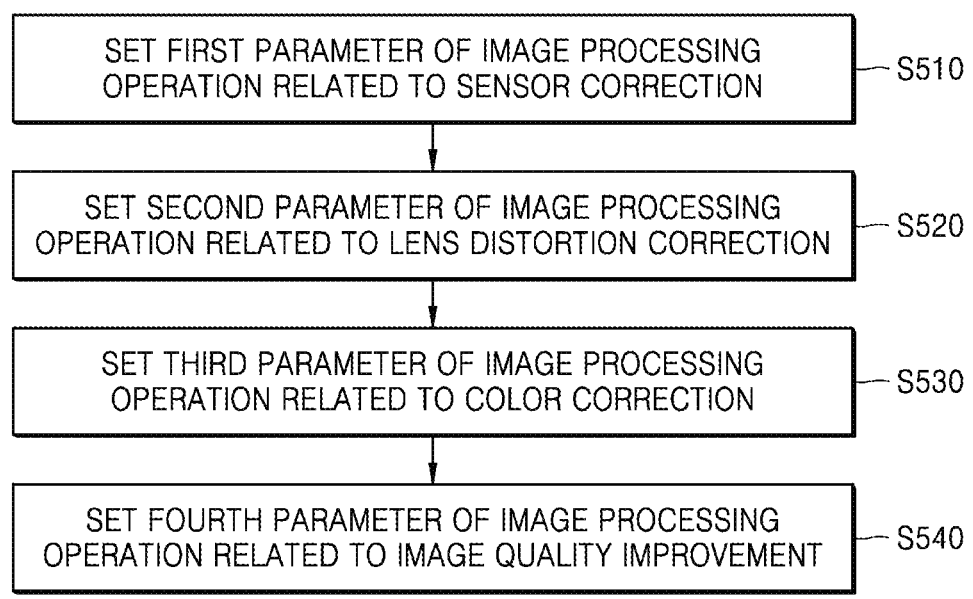
FIG. 7 is a flowchart illustrating the order in which a plurality of image processing operations are set according to example embodiments of the inventive concepts.

FIG. 7 is a flowchart illustrating the order in which the plurality of image processing operations are set according to example embodiments of the inventive concepts.

The image processing operations according to example embodiments of the inventive concepts may include various kinds of image correction operations such as a sensor correction operation, a lens distortion correction operation, a color correction operation, and/or an image quality improvement operation.

The sensor correction operation may include a defect pixel correction operation and an offset correction operation. The defect pixel correction operation may mean an operation of correcting values of bad pixels of a sensor. The bad pixels may include hot pixels that are continuously turned on, dead pixels that are not turned on, and stuck pixels in which at least parts of lower pixels are continuously turned on or off. A parameter of the defect pixel correction operation may be based on information on positions of the bad pixels. The offset correction operation may mean an operation of applying an offset corresponding to a black level that becomes a black reference to an input image. A parameter of the offset correction operation may be based on the offset. The lens distortion correction operation may include a spherical aberration correction operation. The spherical aberration correction operation may mean an operation of correcting distortion caused by refraction of light that passes through a lens. A parameter of the spherical aberration correction operation may be based on a matrix matching pixel values of the input image with pixel values of an output image from which distortion is removed.

The color correction operation may include a demosaic operation, a color gain correction operation, a shading operation, a color correction matrix operation, and a gamma correction operation. The demosaic operation may mean an operation of correcting a lost color value of each pixel based on peripheral pixel values. A parameter of the demosaic operation may be based on a correction function. The color gain correction operation may mean an operation of correcting a difference in gain among RGB colors. A parameter of the color gain correction operation may be based on gain correction values of the RGB colors. The shading operation may mean an operation of correcting brightness distortion. A parameter of the shading operation may be based on a correction value of correcting brightness of an image. The color correction matrix operation may mean an operation of correcting RGB colors and alpha values. A parameter of the color correction matrix operation may be based on a matrix changing a color space of the input image. The gamma correction operation may mean an operation of applying a gamma correction value of correcting a relationship between a pixel value and a brightness value to the input image. A parameter of the gamma correction operation may be based on the gamma correction value.

An image quality improvement operation may include a denoise operation and a sharpening operation. The denoise operation may mean an operation of removing noise in an image. A parameter of the denoise operation may be based on a noise removal function. The sharpening operation may mean an operation of increasing definition of an image. The sharpening operation may be based on a definition function.

Kinds and classifications of the above-described image correction operations are only an example. Another kind of image correction operation may be included or the above-described image correction operations may be classified by another combination. For example, the shading operation and the color correction matrix operation are illustrated as being included in the image processing operation related to the color correction operation. However, when the shading operation and the color correction matrix operation are implemented, the shading operation and the color correction matrix operation may be included in the image processing operation related to the lens distortion correction operation. In another example, the color gain correction operation and the gamma operation are illustrated as being included in the image processing operation related to the color correction operation. However, when the color gain correction operation and the gamma operation are implemented, the color gain correction operation and the gamma operation may be included in the image processing operation related to the image quality improvement operation.

The image processing system 1200 may classify the image processing operations into a plurality of groups and may set the final parameters of the image processing operations in the order of the plurality of groups. In an example, the image processing system 1200 may classify the image processing operations into a sensor correction group, a lens distortion correction group, a color correction group, and an image quality improvement group and may set the final parameters of the image processing operations in the order of the groups.

Referring to FIG. 7, the image processing system 1200 may set the first parameter of the image processing operation related to the sensor correction operation in operation S510. For example, the image processing system 1200 may set the parameter (that is, the first parameter) of each of the defect pixel correction operation and the offset correction operation that are the image processing operations included in the sensor correction group.

The image processing system 1200 may set a second parameter of the image processing operation related to the lens distortion correction operation in operation S520. For example, the image processing system 1200 may set the parameter (that is, the second parameter) of the lens distortion correction operation that is the image processing operation included in the lens distortion correction group.

The image processing system 1200 may set a third parameter of the image processing operation related to the color correction operation in operation S530. For example, the image processing system 1200 may set the parameter (that is, the third parameter) of each of the demosaic operation, the denoise operation, the shading operation, the color correction matrix operation, and the gamma correction operation that are the image processing operations included in the color correction group.

The image processing system 1200 may set a fourth parameter of the image processing operation related to the image quality improvement operation in operation S540. For example, the image processing system 1200 may set the parameter (that is, the fourth parameter) of each of the denoise operation and the sharpening operation that are the image processing operations included in the image quality improvement group.

According to example embodiments, the operation of setting the first parameter related to the sensor correction operation may be performed after the operation of setting the second parameter related to the lens distortion correction operation. The operation of setting the parameters of the sensor correction operation and the lens distortion correction operation may be performed prior to the color correction operation and the image quality improvement operation. It is necessary to perform the sensor correction operation and the lens distortion correction operation prior to the color correction operation and the image quality improvement operation because the sensor correction operation and the lens distortion correction operation are for compensating for a characteristic of the image sensor 1100 capturing an image. According to example embodiments, when the image sensor 1100 has a high specification, an operation of setting at least one parameter among the image processing operations related to the sensor correction operation and the lens distortion correction operation may be omitted.

Figure 8:
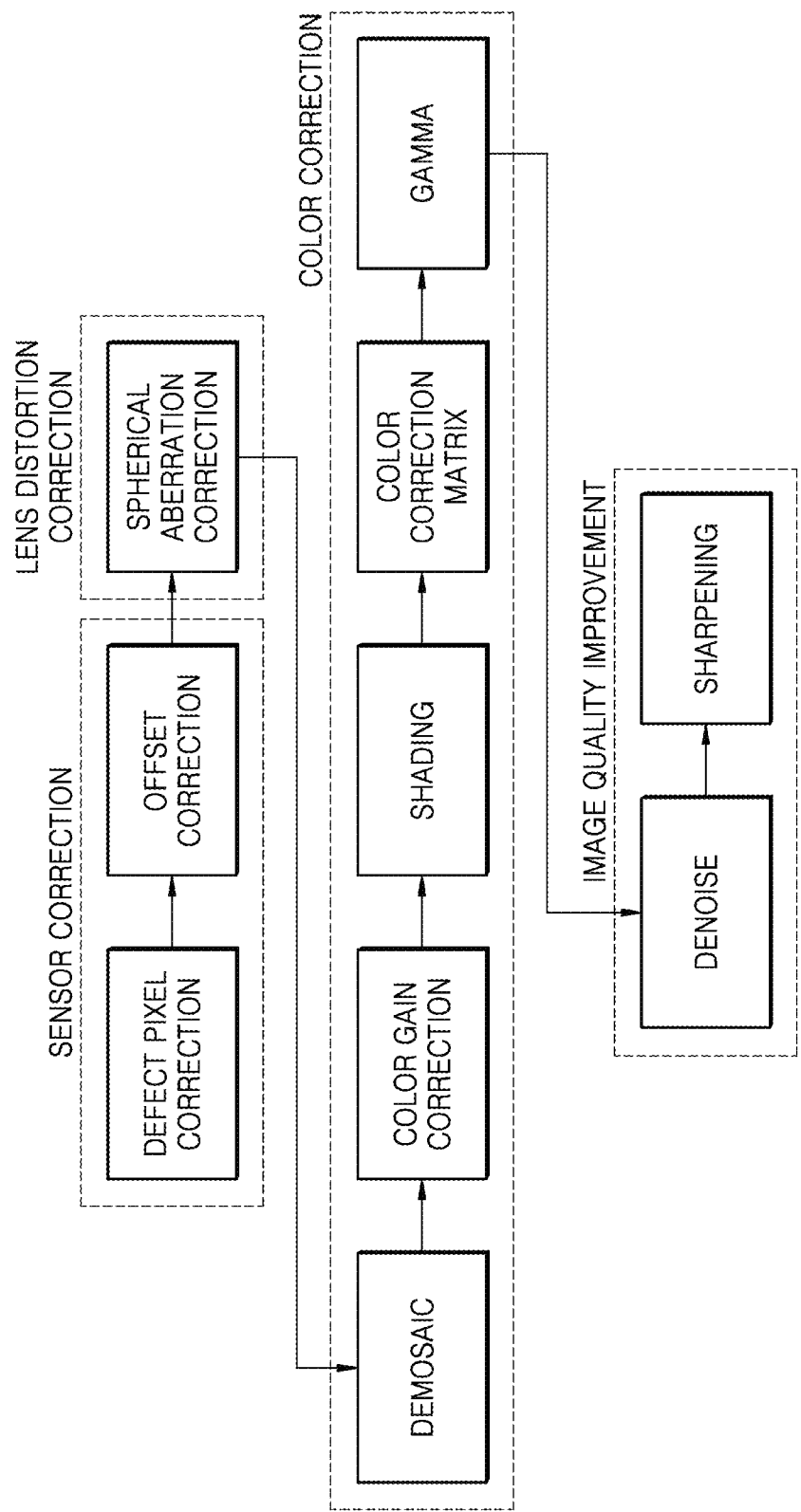
FIG. 8 is a view specifically illustrating the order in which a plurality of image processing operations are set according to example embodiments of the inventive concepts.

FIG. 8 is a view specifically illustrating the order in which a plurality of image processing operations are set according to example embodiments of the inventive concepts. For example, FIG. 8 is a view specifically illustrating the order in which a plurality of image processing operations are set in detail.

Referring to FIGS. 7 and 8, the image processing system 1200 may set the first parameter of the sensor correction group among the image processing operations. For example, the image processing system 1200 may set the parameter of the offset correction operation after setting the parameter of the defect pixel correction operation. The inventive concepts are not limited thereto. After setting the parameter of the offset correction operation, the parameter of the defect pixel correction operation may be set.

The image processing system 1200 may set the second parameter of the lens distortion correction operation among the image processing operations. The image processing system 1200 may set the third parameter of the color correction operation among the image processing operations. For example, the image processing system 1200 may set the parameters of the demosaic operation, the color gain correction operation, the shading operation, the color correction matrix operation, and the gamma correction operation in the order. The above-described order is only an example and the inventive concepts are not limited thereto.

The image processing system 1200 may set the fourth parameter of the image quality improvement operation among the image processing operations. For example, the image processing system 1200 may set the parameters of the demosaic operation and the shading operation in the order. The above-described order is only an example and the inventive concepts are not limited thereto.

The above-described order of FIG. 8 is only the detailed order of the image quality tuning operation of setting the parameters of the image processing operations and the order of performing an image correction operation on an image input later may be the same as or different from the above-described order.

When a parameter of a specific image processing operation is set in the above-described image quality tuning operation, the image processing system 1200 according to example embodiments of the inventive concepts may perform a previous image processing operation based on the set parameter when a parameter of a next image processing operation is set. Hereinafter, the above-described characteristic will be described in detail with reference to FIG. 9.

Figure 9:
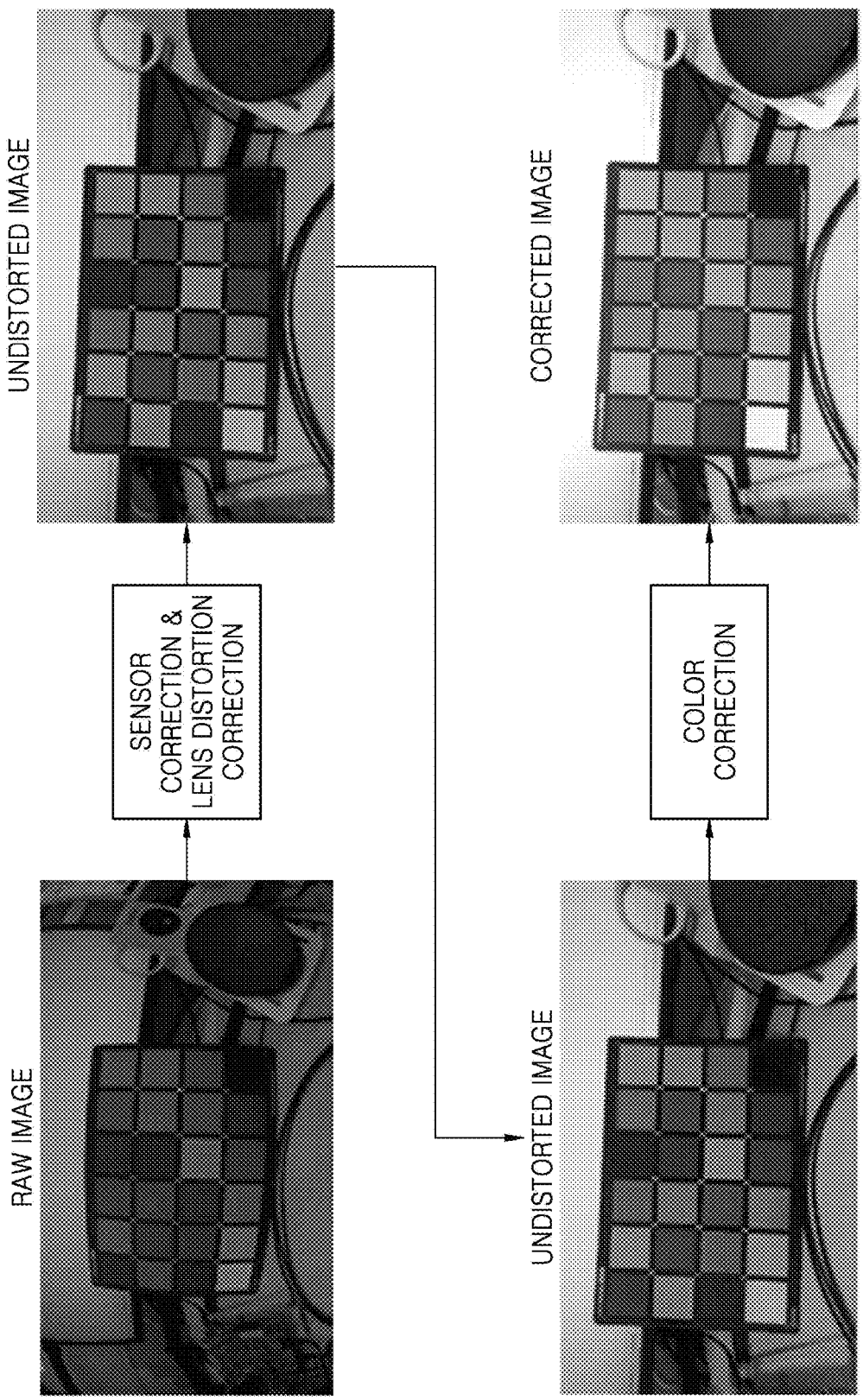
FIG. 9 is a view illustrating a method of performing image quality tuning using a reference image according to example embodiments of the inventive concepts.

FIG. 9 is a view illustrating a method of performing image quality tuning using a reference image according to example embodiments of the inventive concepts.

When a parameter of a specific image processing operation (for example, the first image processing operation) is set, the image processing system 1200 may perform a previous image processing operation (for example, the first image processing operation) based on the set parameter when a parameter of a next image processing operation (for example, the second image processing operation) is set.

For example, when the image processing system 1200 sets the second parameter of the lens distortion correction operation after setting the first parameter of the sensor correction group, the sensor correction operation may be performed on an image corresponding to the lens distortion correction operation based on the first parameter of the sensor correction group. The image processing system 1200 may generate a corrected image by performing the lens distortion correction operation on the sensor corrected image and may set the second parameter of the lens distortion correction operation based on the corrected image and a reference image corresponding to the lens distortion correction operation.

In addition, in another example, referring to FIG. 9, when the image processing system 1200 sets the third parameter of the color correction operation after setting the first parameter of the sensor correction group and the second parameter of the lens distortion correction operation, the sensor correction operation based on the first parameter and the lens distortion correction operation based on the second parameter may be sequentially performed on an image RAW IMAGE corresponding to the color correction operation. The image processing system 1200 may generate a corrected image by performing the color correction operation on the sensor and lens distortion corrected image and may set the third parameter of the color correction operation based on the corrected image and a reference image corresponding to the color correction operation.

Figure 10:
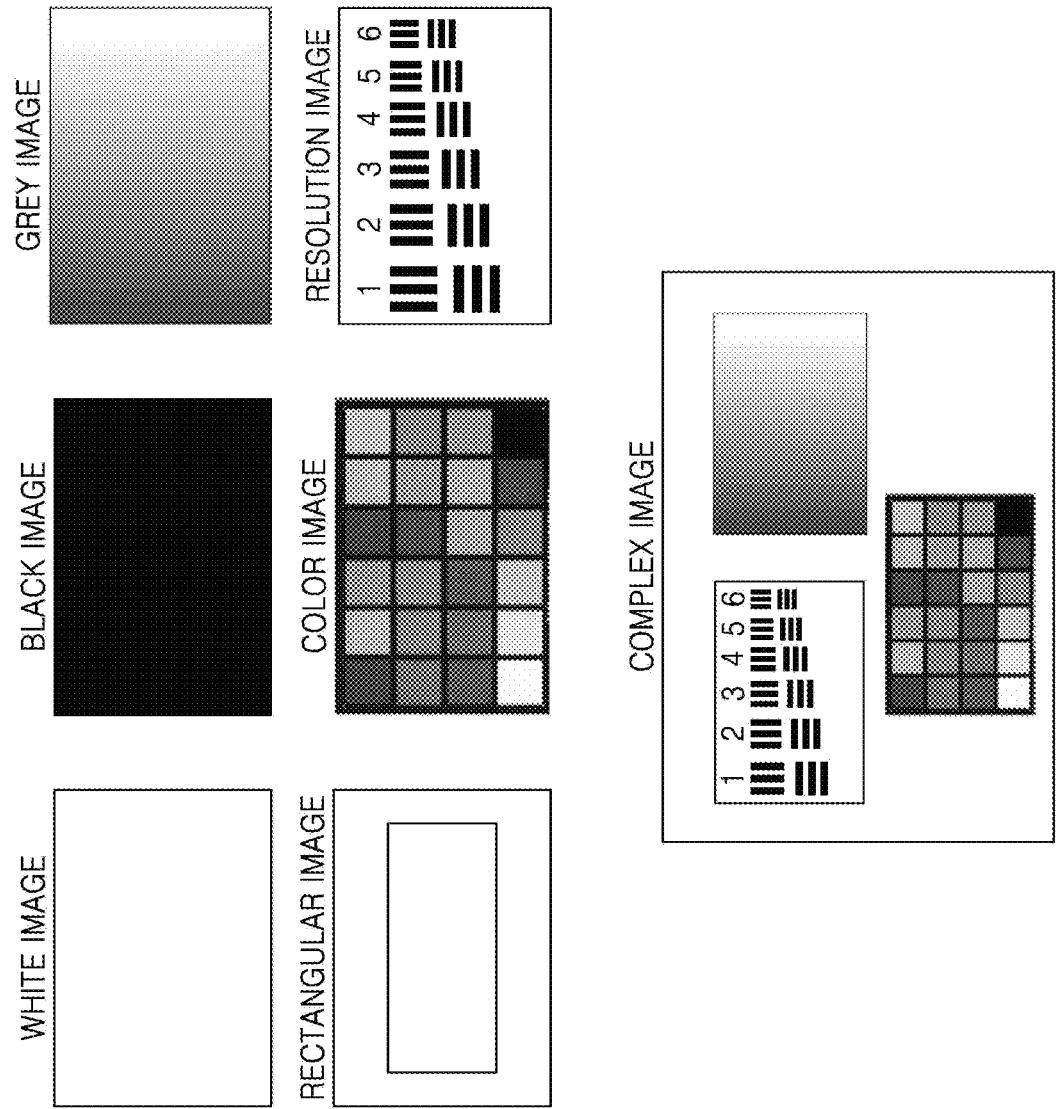
FIG. 10 is a view illustrating reference images according to example embodiments of the inventive concepts.

FIG. 10 is a view illustrating reference images according to example embodiments of the inventive concepts.

The image processing system 1200 may include various kinds of reference images and each of the reference images may be used for setting a parameter of at least one image processing operation.

Referring to FIG. 10, among the reference images, in a white image WHITE IMAGE, all pixels are white and, in a black image BLACK IMAGE, all pixels are black. The white image WHITE IMAGE and the black image BLACK IMAGE may correspond to the defect pixel correction operation.

The image processing system 1200 may set the parameter of the defect pixel correction operation based on an image obtained by capturing the white image WHITE IMAGE and the black image BLACK IMAGE. For example, the image processing system 1200 may compare an image obtained by capturing the white image WHITE IMAGE or the black image BLACK IMAGE with a reference image (that is, the white image WHITE IMAGE or the black image BLACK IMAGE) and may detect a pixel, in which a difference value between the image obtained by capturing the white image WHITE IMAGE or the black image BLACK IMAGE and the reference image is greater than a threshold value, as a bad pixel.

In addition, in another example, the image processing system 1200 may detect a value greater or less than the threshold value in the image obtained by capturing the white image WHITE IMAGE or the black image BLACK IMAGE as the bad pixel. In some example embodiments, the image processing system 1200 may detect the bad pixel without using the reference image. That is, according to example embodiments, when the parameter of the defect pixel correction operation is set in FIG. 4, an operation of receiving the reference image may be omitted. The image processing system 1200 may set the final parameter of the defect pixel correction operation based on the detected bad pixel.

In addition, the black image BLACK IMAGE may correspond to the offset correction operation. In a grey image GREY IMAGE, pixel values evenly change from black to white. The grey image GREY IMAGE may correspond to the gamma correction operation. In a rectangular image RECTANGULAR IMAGE, at least one rectangle is included. The rectangular image RECTANGULAR IMAGE may correspond to the spherical aberration correction operation. Instead of the rectangular image RECTANGULAR IMAGE, another kind of image may be used. For example, a checkerboard image may be used as a reference image corresponding to the spherical aberration correction operation.

In a color image COLOR IMAGE, a plurality of colors are included. The color image COLOR IMAGE may correspond to each of the image processing operations related to color correction, for example, the demosaic operation, the color gain correction operation, and the color correction matrix operation. The resolution image RESOLUTION IMAGE includes a plurality of objects with different scales. The resolution image RESOLUTION IMAGE may correspond to the denoise operation. A complex image COMPLEX IMAGE may include at least one of the above-described reference images. For example, the complex image COMPLEX IMAGE may include the grey image GREY IMAGE, the color image COLOR IMAGE, and the resolution image RESOLUTION IMAGE.

The image processing system 1200 may generate the plurality of corrected images by applying the plurality of parameters of the image processing operation corresponding to the reference image for an image obtained by capturing at least one of the above-described reference images. The image processing system 1200 may determine a corrected image closest to the reference image among the plurality of corrected images. The image processing system 1200 may set a parameter corresponding to the determined corrected image as the final parameter.

FIG. 11 is a view illustrating mapping information between a reference image and an image processing operation according to example embodiments of the inventive concepts. The image processing system 1200 of FIG. 1 or 2 may perform the image quality tuning operation based on the mapping information of FIG. 11.

Referring to FIG. 11, the mapping information may include names (for example, REF_IMG1), indexes (for example, WHITE IMAGE), and corresponding image processing operations (for example, DEFECT PIXEL CORRECTION) of the reference images. The image processing system 1200 may determine an image processing operation corresponding to an image IMG received from the image sensor 1100 based on the mapping information. The image processing system 1200 may perform an image quality tuning operation of setting the parameter of the determined image processing operation. A configuration of the mapping information is not limited to the above-described example. For example, according to example embodiments, a reference image or an image processing operation corresponding to the reference image may be omitted from or added to the mapping information and a mapping configuration between the reference image and the image processing operation may vary.

Figure 12:
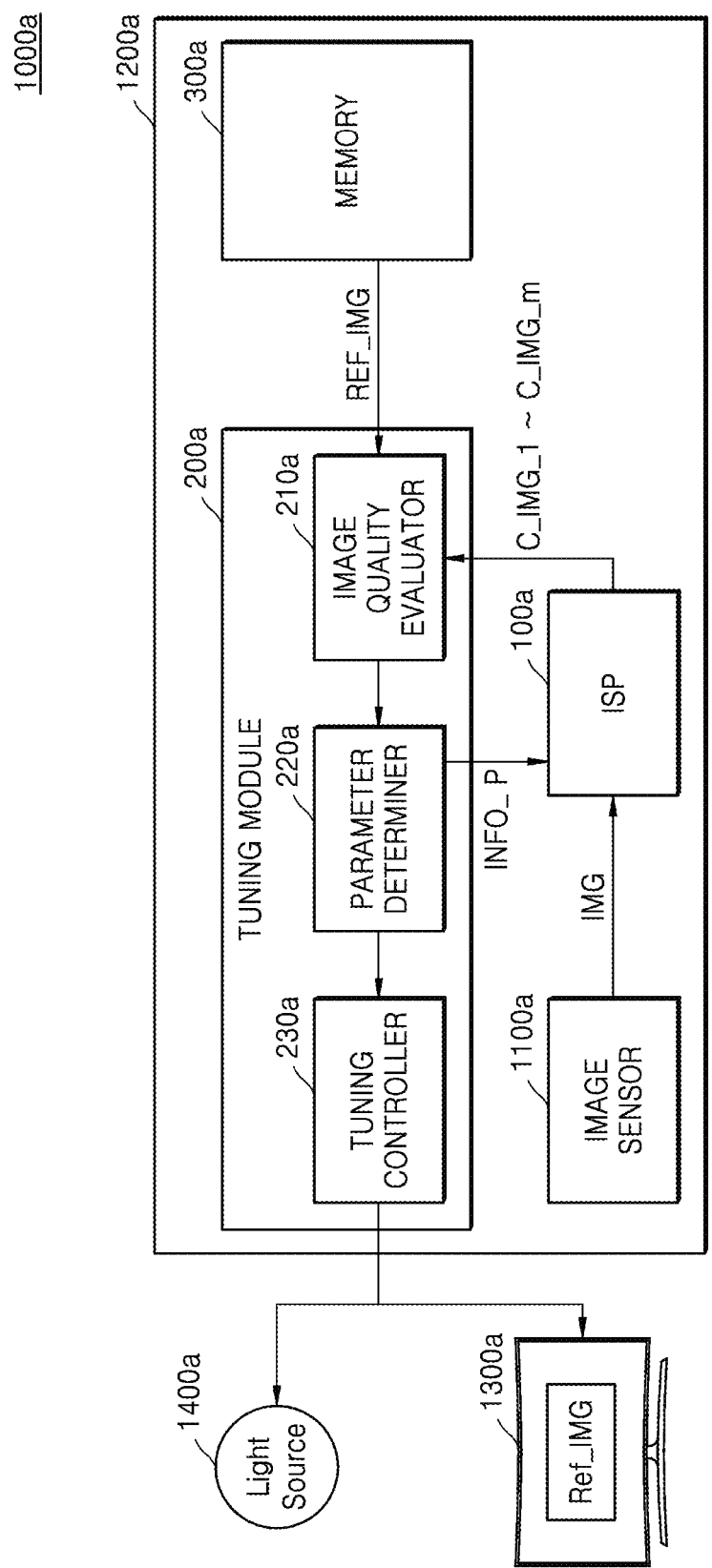
FIGS. 12 and 13 are views illustrating an image processing device according to example embodiments of the inventive concepts.
Figure 13:
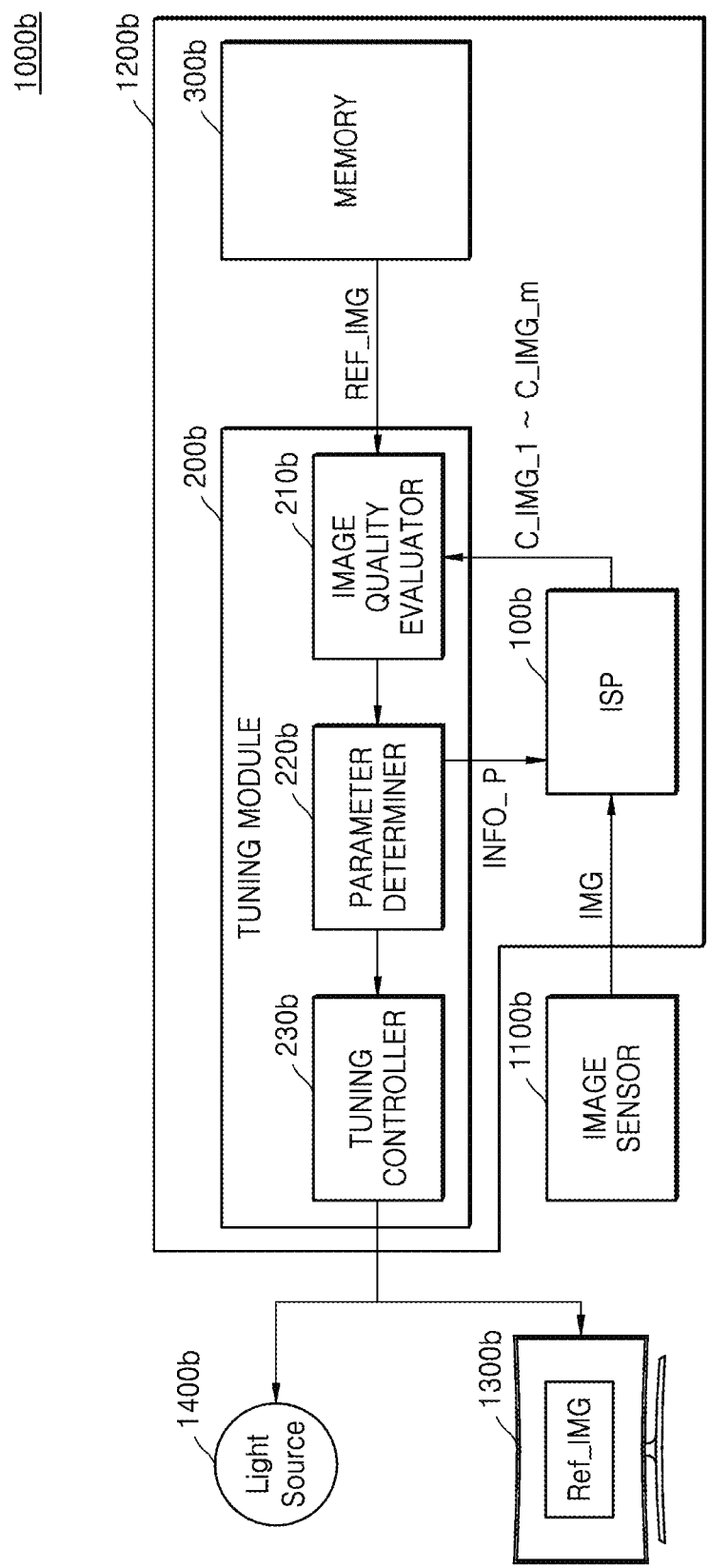

FIGS. 12 and 13 are views illustrating an image processing device 1000a according to example embodiments of the inventive concepts. In detail, FIGS. 12 and 13 are views illustrating the modifiable embodiment of FIG. 1.

Referring to FIG. 12, the image processing device 1000a may include an image processing system 1200a, a display 1300a, and/or a light source 1400a. The image processing system 1200a may include an image sensor 1100a, an image signal processor 100a, a tuning module 200a, and/or a memory 300a.

According to the current example embodiments, the tuning module 200a may include an image quality evaluator 210a, a parameter determiner 220a, and/or a tuning controller 230a. The image quality evaluator 210a and the parameter determiner 220a may correspond to the image quality evaluator 210 and the parameter determiner 220 of FIG. 2.

The tuning controller 230a may control the display 1300a. For example, the tuning controller 230a may control the display 1300a to display one REF_IMG of the plurality of reference images. The tuning controller 230a may request the image sensor 1100a to capture the displayed reference image REF_IMG. The tuning controller 230a may request the image signal processor 100a to perform an image processing operation corresponding to the reference image REF_IMG for image quality tuning while providing information on the reference image REF_IMG. The tuning controller 230a may be implemented by firmware, software, or hardware. Alternatively, the tuning controller 230a may be implemented in the form of a combination of software and hardware.

The image sensor 1100a may provide an image IMG obtained by capturing the reference image REF_IMG to the image signal processor 100a. The image signal processor 100a may perform the image processing operation corresponding to the reference image REF_IMG a plurality of times for the received image IMG. The image signal processor 100a may provide the first to mth corrected images C_IMG_1 to C_IMG_m generated by the image processing operation performed a plurality of times to the tuning module 200a. The tuning module 200a may set the parameter of the image processing operation based on the first to mth corrected images C_IMG_1 to C_IMG_m and the reference image REF_IMG. The tuning controller 230a may control the display 1300a to display a reference image REF_IMG corresponding to a next image processing operation when a parameter of a specific image processing operation is set.

The tuning controller 230a may control the light source 1400a other than the display 1300a. The light source 1400a may control various illumination environments in accordance with control of the tuning controller 230a. The image sensor 1100a may output a plurality of images IMG by capturing the reference image REF_IMG in the various illumination environments in accordance with control of the tuning module 220a or the image signal processor 100a. The image signal processor 100a and the tuning module 220a may set the parameters of the image processing operations by the method described with reference to FIGS. 1 to 11. Therefore, the image processing system 1200a may set the parameters allowing image processing to be performed with high accuracy even in the various illumination environments.

For example, the tuning controller 230a may control the light source 1400a to provide a first illumination environment and may control the display 1300a to display the reference image REF_IMG. The image sensor 1100a may output a first image IMG obtained by capturing the reference image REF_IMG in the first illumination environment. The tuning controller 230a may control the light source 1400a to provide a second illumination environment and may control the display 1300a to display the reference image REF_IMG. The image sensor 1100a may output a second image IMG obtained by capturing the reference image REF_IMG in the second illumination environment. The image signal processor 100a may generate the first corrected image C_IMG_1 and the second corrected image C_IMG_2 by performing the first image processing operation on the first image IMG and the second image IMG based on a default parameter. The tuning module 200a may calculate correlations by comparing the first corrected image C_IMG_1 and the second corrected image C_IMG_2 with the reference image REF_IMG and may set the parameter of the first image processing operation based on the calculated correlations. The image processing system 1200a may repeatedly perform the above-described series of operations on the remaining image processing operations.

An image processing system 1200b may be implemented not to include an image sensor 1100b as illustrated in FIG. 13. In some example embodiments, a tuning controller 230b of the image processing system 1200b may be implemented to control the image sensor 1100b as well as a display 1300b and/or a light source 1400b. For example, the tuning controller 230b may control the light source 1400b to provide a specific illumination environment, may control the display 1300b to display a specific reference image REF_IMG, and may control the image sensor 1100b to capture the reference image REF_IMG displayed by the display 1300b.

In each of FIGS. 12 and 13, it is illustrated that only one image sensor 1100a or 1100b is provided. However, a plurality of image sensors 1100a or 1100b may be provided. Each of the tuning modules 200a and 200b may set the parameters of the image processing operation corresponding to each of the plurality of image sensors 1100a and 1100b. For example, when a first image sensor and a second image sensor are provided, the tuning modules 200a and 200b may individually set parameters applied to an image output from the first image sensor and parameters applied to an image output from the second image sensor.

Figure 14:
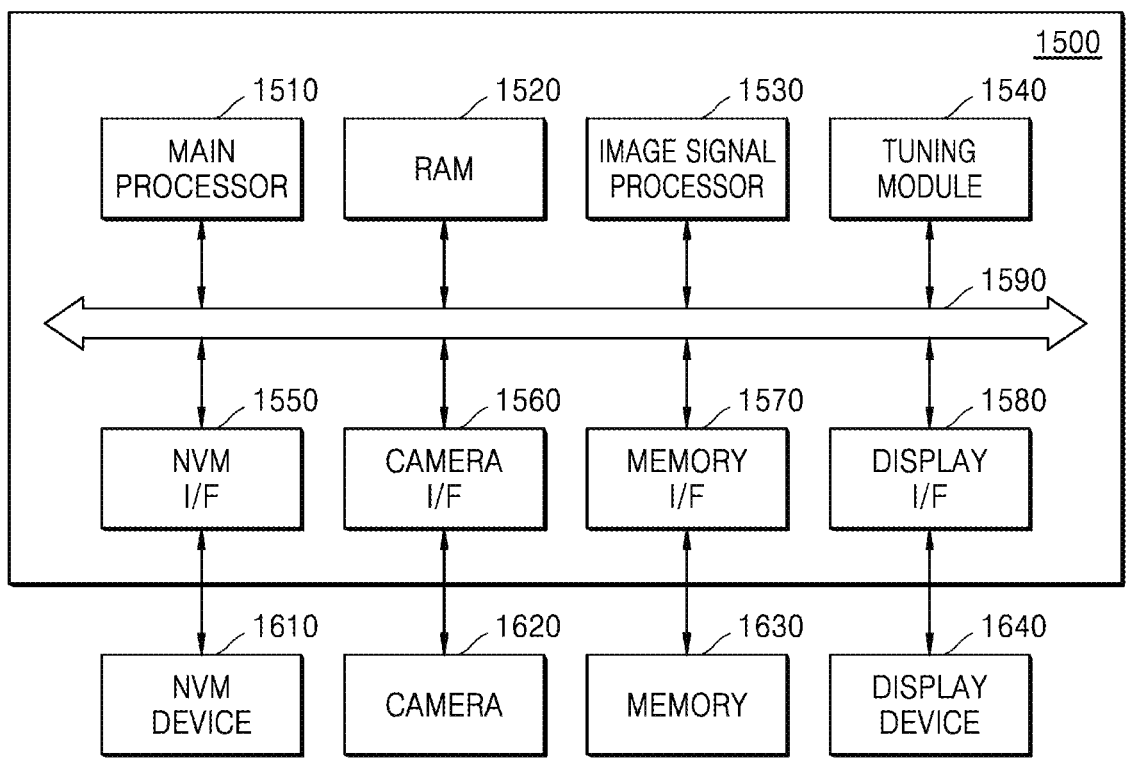
FIG. 14 is a view illustrating an application processor according to example embodiments of the inventive concepts.

FIG. 14 is a view illustrating an application processor 1500 according to example embodiments of the inventive concepts. Referring to FIG. 14, the application processor 1500 may include a main processor 1510, a random access memory (RAM) 1520, an image signal processor 1530, a tuning module 1540, a non-volatile memory interface 1550, a camera interface 1560, a memory interface 1570, and a display interface 1580. The main processor 1510, the RAM 1520, the image signal processor 1530, the tuning module 1540, the non-volatile memory interface 1550, the camera interface 1560, the memory interface 1570, and the display interface 1580 of the application processor 1500 may transmit and receive data to and from each other through a bus 1590.

The main processor 1510 may control an overall operation of the application processor 1500. The main processor 1510 may be implemented by, for example, a central processing unit (CPU) or a microprocessor. According to example embodiments, the main processor 1510 may be implemented by a computing component having two or more independent processors (or cores), that is, a multi-core processor. The main processor 1510 may process or execute programs and/or data stored in the RAM 1520 (or read only memory (ROM)).

The RAM 1520 may temporarily store programs, data, and/or instructions. According to example embodiments, the RAM 1520 may be implemented by dynamic RAM (DRAM) or static RAM (SRAM). The RAM 1520 may temporarily store an image input and output through the non-volatile memory interface 1550, the camera interface 1560, the memory interface 1570, and the display interface 1580 or generated by the image signal processor 1530 or the main processor 1510.

According to example embodiments, the application processor 1500 may further include the ROM. The ROM may store continuously used programs and/or data. The ROM may be implemented by erasable programmable ROM (EPROM) or electrically erasable programmable ROM (EEPROM). The non-volatile memory interface 1550 may interface data input from a non-volatile memory device 1610 or data output to non-volatile memory. The non-volatile memory device 1610 may be implemented by, for example, a memory card such as a multimedia card (MMC), an eMMC, a secure digital (SD) card, or a micro SD card.

The camera interface 1560 may interface data (for example, an image obtained by capturing a reference image) input from a camera 1620 outside the application processor 1500. The camera 1620 may generate data on an image captured by a plurality of light sensing elements. An image received through the camera interface 1560 may be provided to the image signal processor 1530 or may be stored in a memory 1630 through the memory interface 1570.

The memory interface 1570 may interface data input from or output to the memory 1630 outside the application processor 1500. According to example embodiments, the memory 1630 may be implemented by volatile memory such as DRAM or SRAM or non-volatile memory such as resistive RAM (ReRAM), phase-change RAM (PRAM), or a NAND flash.

The display interface 1580 may interface data (for example, a corrected image) output to a display device 1640. The display device 1640 may output data on an image through a display such as a liquid-crystal display (LCD) or an active matrix organic light emitting diode (AMOLED).

The image signal processor 1530 may correspond to the image signal processor 100 of FIG. 1 or 2. In addition, the tuning module 1540 may correspond to the tuning module 200 of FIG. 1 or 2.

While the inventive concepts have been particularly shown and described with reference to example embodiments thereof, it will be understood that various changes in form and details may be made therein without departing from the spirit and scope of the following claims.

What is claimed is:

1. An image processing system comprising:
a memory configured to store a plurality of reference images used for image quality tuning; and
processing circuitry configured to receive a plurality of captured images corresponding to the plurality of reference images, configured to generate a plurality of corrected images by being configured to perform a corresponding image processing operation among a plurality of image processing operations, and configured to set parameters of the plurality of image processing operations based on the plurality of corrected images and the plurality of reference images,
wherein the processing circuitry is configured to
generate a first corrected image by performing a first image processing operation corresponding to a first reference image on a first captured image corresponding to the first reference image, and configured to set at least one first parameter of the first image processing operation based on a correlation between the first corrected image and the first reference image, the at least one first parameter corresponding to at least one of a defect pixel correction operation and an offset correction operation, and
generate a second corrected image by performing a second image processing operation on the first corrected image and set a second parameter of the second image processing operation based on the second corrected image and a reference image, from among the plurality of reference images, corresponding to the second image processing operation.

2. The image processing system of claim 1, wherein the processing circuitry is configured to generate the first corrected image by performing the first image processing operation on the first captured image based on a first default parameter.

3. The image processing system of claim 1, wherein the processing circuitry is configured to generate a plurality of first corrected images by performing the first image processing operation a plurality of times on the first captured image based on first default parameters having different values.

4. The image processing system of claim 3, wherein the processing circuitry is configured to calculate correlations between the plurality of first corrected images and the first reference image, is configured to determine a specific first corrected image closest to the first reference image based on the calculated correlations, and is configured to set a first default parameter corresponding to the specific first corrected image as the first parameter.

5. The image processing system of claim 1, wherein the processing circuitry is configured to generate the second corrected image by performing a second image processing operation corresponding to a second reference image on a second captured image corresponding to the second reference image when the first parameter is set and is configured to set at least one second parameter of the second image processing operation based on a correlation between the second corrected image and the second reference image.

6. The image processing system of claim 5, wherein the processing circuitry is configured to generate the second corrected image by being configured to perform the second image processing operation after being configured to perform the first image processing operation on the second captured image based on the set first parameter.

7. The image processing system of claim 1, wherein the plurality of image processing operations comprise at least one of a sensor correction operation, a lens distortion correction operation, a color correction operation, and an image quality improvement operation.

8. The image processing system of claim 7, wherein the processing circuitry is configured to sequentially generate the plurality of corrected images by performing a corresponding image processing operation on each of the plurality of captured images in an order of the plurality of image processing operations is configured to sequentially set parameters of the plurality of image processing operations based on the plurality of corrected images and the plurality of reference images in the order.

9. The image processing system of claim 8, wherein, in the order, the lens distortion correction operation precedes at least one of the color correction operation and the image quality improvement operation.

10. The image processing system of claim 7, wherein the plurality of reference images are at least one of a white image, a black image, a grey image, a rectangular image, a color image, and a resolution image or a combination of at least two thereof.

11. The image processing system of claim 10, wherein the white image corresponds to the defect pixel correction operation,
wherein the black image corresponds to at least one of the defect pixel correction operation and the offset correction operation, wherein the grey image corresponds to a gamma correction operation, wherein the rectangular image corresponds to the lens distortion correction operation, wherein the color image corresponds to at least one of a demosaic operation, a color gain correction operation, and a color correction matrix operation, and wherein the resolution image corresponds to a denoise operation.

12. An image processing system comprising:

a memory configured to store a plurality of reference images used for image quality tuning; and processing circuitry configured to perform a plurality of image processing operations and configured to perform a tuning operation of setting a parameter of a target image processing operation among the plurality of image processing operations, wherein the tuning operation comprises,
  obtaining an image by capturing a reference image, from among the plurality of reference images, corresponding to the target image processing operation,
  generating a corrected image by performing the target image processing operation on a captured image based on the parameter of the target image processing operation, and
  updating the parameter of the target image processing operation based on the corrected image and the reference image, and wherein a plurality of corrected images include a first corrected image and a second corrected image, and the plurality of image processing operations include a first image processing operation and a second image processing operation, wherein the processing circuitry is configured to perform the tuning operation on each of the plurality of image processing operations such that the second corrected image is generated by performing the second image processing operation on the first corrected image and setting a parameter of the second image processing operation based on the second corrected image and a specific reference image, from among the plurality of reference images, corresponding to the second image processing operation, and wherein the parameter of the target image processing operation corresponds to at least one of a defect pixel correction operation and an offset correction operation.

13. The image processing system of claim 12, wherein the processing circuitry is configured to sequentially perform the tuning operation in an order of the plurality of image processing operations.

14. The image processing system of claim 13, wherein the processing circuitry is configured to generate the corrected image by performing the target image processing operation after performing an image processing operation on the captured image prior to the target image processing operation in the order.

15. The image processing system of claim 12, further comprising an image sensor, wherein the processing circuitry is configured to control the image sensor to output the captured image by capturing a corresponding one of the plurality of reference images.

16. The image processing system of claim 12, further comprising a communication device, wherein the processing circuitry is configured to control the communication device to transmit a request signal requesting a corresponding one of the plurality of reference images to be displayed to an external device.

17. An image quality tuning method comprising:

obtaining a plurality of captured images by capturing a plurality of reference images;

generating a plurality of corrected images by performing at least one corresponding image processing operation among a plurality of image processing operations on the plurality of captured images; and setting parameters of the plurality of image processing operations based on the plurality of corrected images and the plurality of reference images, wherein at least one of the parameters corresponds to at least one of a defect pixel correction operation and an offset correction operation, wherein the plurality of corrected images include a first corrected image and a second corrected image, and the plurality of image processing operations include a first image processing operation and a second image processing operation, and wherein in the generating, the second corrected image is generated by performing the second image processing operation on the first corrected image and setting a parameter, from among the parameters, of the second image processing operation based on the second corrected image and a reference image, from among the plurality of reference images, corresponding to the second image processing operation.

18. The image quality tuning method of claim 17, wherein the setting of the parameters of the plurality of image processing operations comprises:

calculating a correlation between each of the plurality of corrected images and a corresponding reference image; and setting a parameter of an image processing operation corresponding to each of the plurality of corrected images based on the calculated correlation.

19. The image quality tuning method of claim 18, wherein the plurality of reference images are at least one of a white image, a black image, a grey image, a rectangular image, a color image, and a resolution image or a combination thereof.

* * * * *